Dec. 22, 1942.  J. TJAARDA  2,305,936
MOTOR VEHICLE
Filed March 23, 1940　　2 Sheets-Sheet 1

INVENTOR
John Tjaarda.
BY
Dike, Calver & Gray
ATTORNEYS.

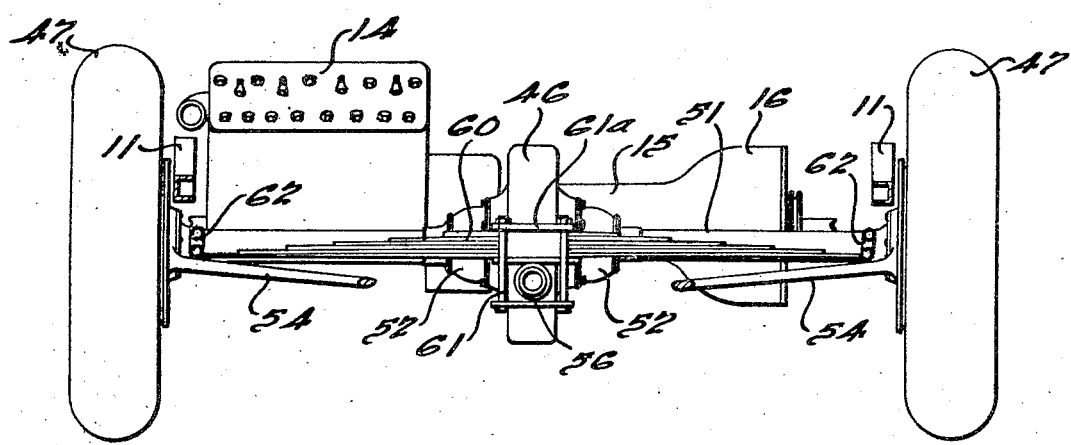

Patented Dec. 22, 1942

2,305,936

UNITED STATES PATENT OFFICE 2,305,936

MOTOR VEHICLE

John Tjaarda, Detroit, Mich., assignor to Briggs Manufacturing Company, Detroit, Mich., a corporation of Michigan Application March 23, 1940, Serial No. 325,567

9 Claims. (Cl. 180—54)

This invention relates to motor vehicles and more particularly to motor vehicles in which the power plant and the driving wheels are mounted at the rear of the vehicle.

One of the objects of the present invention is to provide a motor vehicle having an engine and the driving wheels mounted at the rear of the vehicle, and improved means transmitting the motive power in the form of torque from the engine to the driving wheels.

Another object of the invention is to provide a motor vehicle having driving wheels mounted at the rear of the vehicle and improved means transmitting the vehicle propelling force from the driving wheels to the vehicle structure.

A further object of the invention is to provide an improved motor vehicle having the engine and the driving wheels mounted at the rear of the vehicle, said wheels being provided with improved means whereby they are free to move vertically in response to road irregularities, such movements not interfering with the transmission of power from the engine to the driving wheels and transmission of the vehicle propelling force from the driving wheels to the vehicle frame.

A still further object of the invention is to provide a motor vehicle having an engine assembly including a transmission and a clutch, mounted transversely of the vehicle in close proximity to the driving wheels, and a final drive means arranged between the engine and the transmission.

A still further object of the invention is to provide an improved motor vehicle in which the weight of the unsprung structure is considerably reduced.

It is an added object of the present invention to provide an improved motor vehicle of the foregoing character, which is relatively simple in construction, and inexpensive to manufacture and service.

Other objects of this invention will appear in the following description and appended claims, reference being had to the accompanying drawings forming a part of this specification wherein like reference characters designate corresponding parts in the several views.

Fig. 3 is an end view partly in section taken in the direction of the arrows on the vertical section plane passing through the line 3—3 of Fig. 2.

Fig. 4 is a sectional view taken in the direction of the arrows on the vertical section plane passing through the line 4—4 of Fig. 2.

Fig. 5 is a sectional view taken in the direction of the arrows on the section plane passing through the line 5—5 of Fig. 4.

Figure 1:
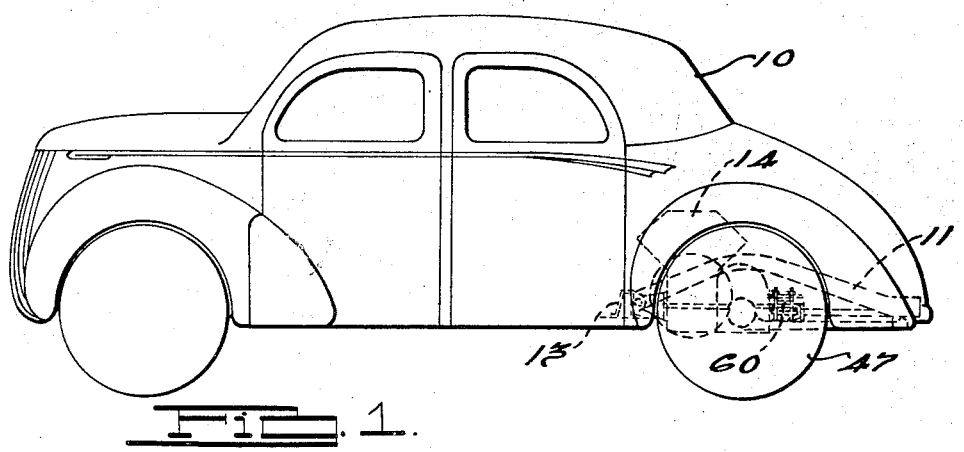
Fig. 1 is a side view of a motor vehicle embodying the present invention.
Figure 2:
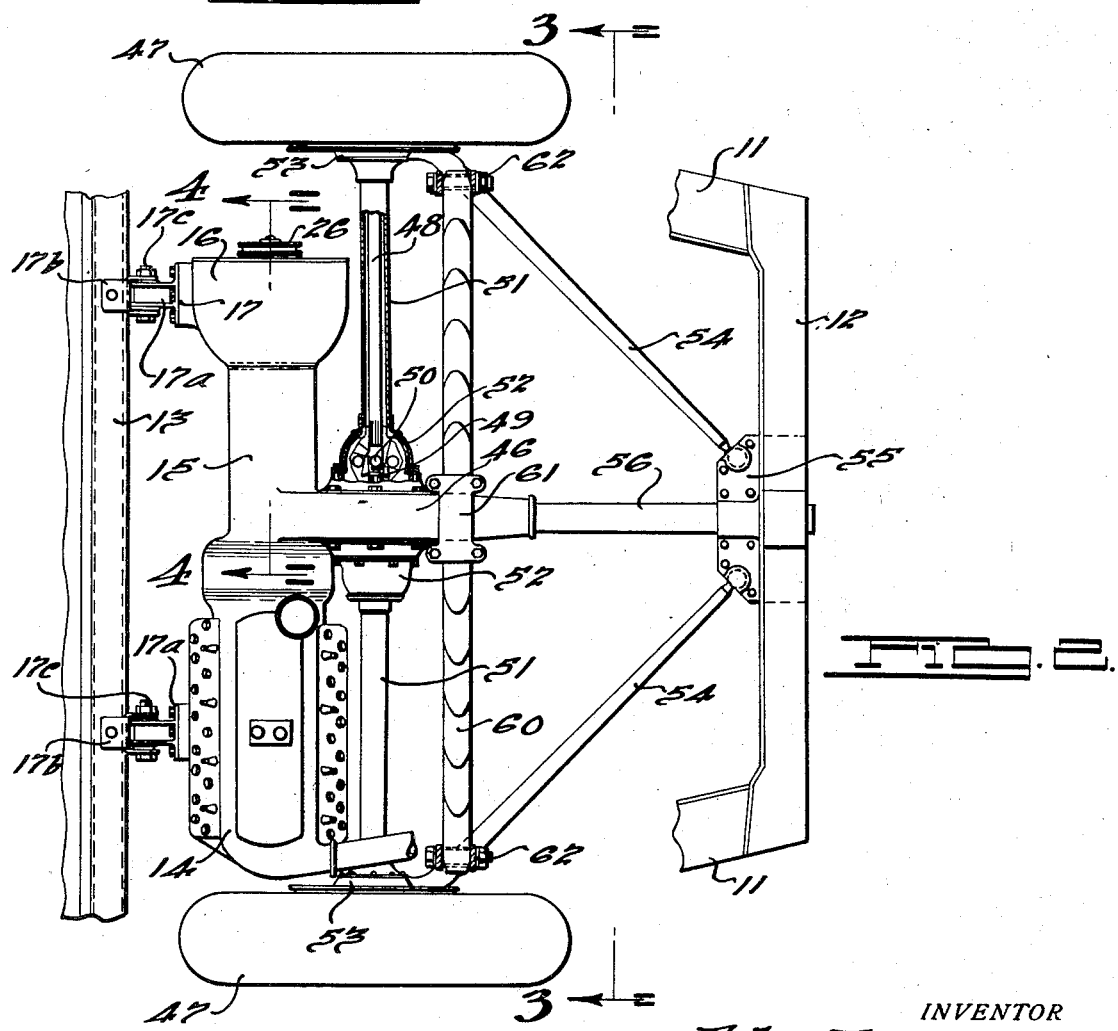
Fig. 2 is a plan view of the rear portion of the motor vehicle illustrated in Fig. 1, said view showing the suspension of the power plant assembly and of the driving wheels.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, a motor vehicle embodying the present invention. The present application describes the invention as embodied in a motor vehicle of the passenger type provided with an internal combustion engine. It will be understood, however, that the present invention is equally applicable to motor vehicles of other than passenger types, such for instance as to trucks, and also to vehicles using engines or motors other than of the internal combustion engine type.

The motor vehicle illustrated in Fig. 1 and indicated therein by the numeral 10 has a frame comprising side members 11 bent upwardly near their rear ends as indicated in dotted lines in Fig. 1 and having a plurality of cross members, only two of said members indicated by the numerals 12 and 13 being shown in the drawings, since the remaining cross members do not enter as a factor of importance into the present invention. Thus, the rear portions of the side frame members 11 and the cross members 12 and 13 form a substantially rectangular frame in which the power plant assembly is operatively suspended.

In the present embodiment the power plant assembly includes an engine 14 having a casing 14a, preferably integral with a casing 15a of a transmission 15, which casing is in turn integral with the casing 16a of the clutch device 16. By virtue of such a construction a rigid structure is formed which may be suspended or mounted on the frame as a single unit or assembly. The mounting connections are exemplified by two connectors 17 including brackets 17a secured to the engine, and cross head brackets 17b secured preferably by riveting to the frame cross member 13. Bolts 17c connect the brackets 17a and 17b, a resilient bushing (not shown) being provided around the bolt in order to break the metal path from the engine to the frame member 13 thus dampening vibrations caused by the operation of the engine.

The engine 14 includes a crankshaft 20 having a flywheel 21 secured to one of its ends. To the flywheel 21 there is connected by means of bolts 22 an internally splined spider 23 mounted on the externally splined end of a straight shaft 24. A resilient ring 25 preferably of rubber, is interposed between the spider 23 and the flywheel 21 in order to provide a resilient connection therebetween and to dampen vibrations which may occur in the flywheel during the operation of the engine.

The straight shaft 24 extends coaxially of the crankshaft 20 throughout the entire length of the transmission casing 15a and clutch casing 16a, and it carries at its opposite end a fan pulley 26. Adjacent said pulley the straight shaft 24 is externally splined as indicated at 24a in order to engage an internally splined hub 27 of the clutch 16 which is journaled in a thrust roller bearing 28 arranged in the plane 29 fitted into the clutch casing 16a. To the hub 27 there is secured by means of bolts or in any other suitable manner an annular member 30 adapted to engage or to disengage a second clutch member 31 moved toward said first member with the aid of a plurality of springs 32 and away from said member with the aid of a throw out finger 33. Frictional disks are arranged between said clutch members 31 and 32 in a manner well known in the art in order to effect frictional engagement of said members. The second clutch member 31 is internally splined and slides on an externally splined end of a clutch shaft sleeve 34 journaled in a roller bearing 35 arranged in a partition 36 integral with the casings 15a and 16a. The clutch shaft sleeve 34 extends over the straight shaft 24 and rotates independently therefrom to engage and to disengage a plurality of transmission gears which are internally splined and slide on an externally splined transmission shaft sleeve 37. The transmission shaft sleeve 37 is journaled in the bearings 38 and 39 arranged in partitions 40 and 41 respectively, integral with the transmission casing 15a. The transmission gears are positively connected for rotation with the transmission shaft sleeve 37 and operate thereon in a manner known in the art and no detailed description of the operation of the transmission is deemed necessary.

On the transmission shaft sleeve 37 and within the chamber formed by the partitions 40 and 41 there is formed a final drive pinion 44 meshing with a final drive gear 45 connected to a suitable differential device (not shown) and operatively mounted in the housing 46. Power in the form of torque is transmitted to the driving wheels 47 by means of two half axles 48 secured to said wheels by their outer ends to rotate said wheels, the inner ends of said half axles being connected to the outwardly protruding ends 49 of the differential device which connection is effected by means of a pair of universal joints generally indicated by the numeral 50. By virtue of such a construction power is transmitted from the crankshaft 20 to the straight shaft 24, through the clutch 16 to the sleeves 34 and 37, and thereupon through the final drive half axles 48 to the driving wheels 47.

Each of said half axles 48 is provided with a tubular housing 51 which is connected to the final drive housing 46 by means of a universal joint 52 preferably of the ball and socket type. The outer ends of the tubular housings 51 are connected in a manner well known in the art to the wheel supporting hubs 53 for transmission of operative and particularly vertical loads thereto. The universal joints 50 and 52 of each respective pair of joints have a common geometric center and therefore the half axles 48 and their tubular housings 51 remain concentric in all positions of the driving wheels 47. To said hubs 53 there are secured the front ends of radius rods 54 the rear ends of which are universally connected to a bracket 55 secured to the cross member 12. To said bracket 55 there is also secured in any suitable manner the rear end of a torque tube 56 the front end of which is secured to the final drive housing 46. In some cases it may be desirable to permit slight longitudinal movement of the torque tube 56 in the collar of the bracket 55. In such cases some non-metallic means may be provided in said collar to prevent squeaking. By virtue of the provision of the torque tube 56, the torque reaction is transmitted to the frame of the vehicle and the third point of power plant suspension is also provided.

Unresisted by any means the driving wheels 47 would be free to move vertically in response to road irregularities, their vertical path being determined by the respective lengths of the tubular housings 51 and radius rods 54. It will be understood that such vertical movements of the driving wheels do not in any way interfere with the transmission of driving torque from the power plant to the driving wheels, since both the half axles 48 and their tubular housings 51 are universally connected to the power plant assembly.

Means resiliently resisting the vertical movements of the driving wheels are exemplified in the present embodiment by a cross spring 60 of the leaf type, said spring having a middle portion mounted on the final drive housing 46 by means of a connection generally indicated by the numeral 61. The ends of the spring 60 are connected by means of shackles 62 to the forward ends of the radius rods 54 or to the wheel supporting hubs 53 in order to transmit the load of the sprung portion of the vehicle to said wheels.

It will now be seen in view of the foregoing that the driving torque developed by the crankshaft of the engine is transmitted to the driving wheels 47 by means of the half axles 48, while the torque reaction produced by the rotative effort of the engine is transmitted to the frame of the vehicle by means of the torque tube 56 and mounting connectors 17. The vehicle propelling force or the draw bar pull developed by the drive wheels is transmitted to the frame of the vehicle by means of the radius rods 54. The weight of the sprung portion of the vehicle, which portion includes the frame and the power plant assembly, is transmitted to the driving wheels of the vehicle through the cross spring 60 and shackles 62 to the wheel supporting hubs 53.

I claim:

1. In a motor vehicle having a frame, an engine assembly including an engine, a transmission, a clutch and a final drive rigidly secured together, said engine assembly being mounted on said frame and connected thereto at three points, a pair of driving wheels drivingly connected to said final drive and carried by said engine assembly being free to move vertically, a cross spring secured to said engine assembly and adapted to resist resiliently the upward movements of said wheels, and a pair of rods, said rods extending rearwardly of said wheels and each having one end secured to a respective wheel structure and another end hingedly secured to said frame to transmit thereto the vehicle propelling force.

2. In a motor vehicle having a frame, an engine assembly including an engine, a clutch and a transmission, said engine assembly being mounted on said frame at the rear of said vehicle and transversely thereof at two points; a pair of wheels drivingly connected to said transmission and adapted to move vertically in response to road irregularities; a transverse leaf spring carried by said engine assembly and having ends connected respectively to said wheels for resisting yieldingly upward movements thereof; a torque tube having one end secured to said engine assembly and another end connected to said frame to provide a third point of suspension for said engine assembly and to transmit torque reaction to said frame; and a pair of radius rods each having one end rigidly secured to the structure of the respective wheel to permit rotation thereof but to follow its bodily movements; and a ball and socket means for securing the other end of each rod to said frame.

3. In a motor vehicle having a frame, a power plant assembly including an engine, a clutch, a transmission, and final drive means arranged in said assembly substantially at the center line of the vehicle; two mounting connections arranged in front of said power plant assembly for connecting the same to said frame, a pair of driving wheels arranged at the rear of the vehicle and having supporting hubs, a pair of half axles drivingly connected to said wheels, a pair of universal joints connecting the inner ends of said half axles with said final drive means, a tubular housing for each of said half axles having its outer end operatively connected to a wheel supporting hub, a second pair of universal connections for connecting the inner ends of said tubular housings to said power plant assembly, and a pair of radius rods arranged rearwardly of said power plant assembly and having their ends operatively connected to said wheel supporting hubs and to said frame, respectively.

4. In a motor vehicle having a frame, a power plant assembly including an engine, a clutch, a transmission, and final drive means arranged in said assembly substantially at the center line of the vehicle; two mounting connections arranged in front of said power plant assembly for connecting the same to said frame, a pair of driving wheels arranged at the rear of the vehicle and having supporting hubs, a pair of half axles arranged rearwardly of said engine and drivingly connected to said wheels, a pair of universal joints connecting the inner ends of said half axles with said final drive means, a tubular housing for each of said half axles having its outer end operatively connected to a wheel supporting hub, a second pair of universal connections for connecting the inner ends of said tubular housings to said power plant assembly, a pair of radius rods having their respective ends operatively connected to said wheel supporting hubs and to said frame, and a torque tube extending from said assembly rearwardly thereof and having its ends secured respectively to said power plant assembly and said frame.

5. In a motor vehicle having a frame, a power plant assembly including an engine, a clutch, a transmission, and final drive means arranged in said assembly substantially at the center line of the vehicle; two mounting connections arranged in front of said power plant assembly for connecting the same to said frame, a pair of driving wheels arranged at the rear of the vehicle and having supporting hubs, a pair of half axles drivingly connected to said wheels, a pair of universal joints connecting the inner ends of said half axles with said final drive means, a tubular housing for each of said half axles having its outer end operatively connected to a wheel supporting hub for transmission of vertical loads thereto, a second pair of universal connections for connecting the inner ends of said tubular housings to said power plant assembly, a pair of radius rods having their respective ends operatively connected to said wheel supporting hubs and to said frame for transmitting the vehicle propelling force from said wheels to said frame, and spring means operatively interposed between said wheel supporting hubs and the power plant assembly for resilient transmission of vertical loads from said wheels to said frame through the structure of said power plant assembly.

6. In a motor vehicle having a frame, a power plant assembly including an engine, a clutch, a transmission, and final drive means arranged in said assembly substantially at the center line of the vehicle; two mounting connections arranged in front of said power plant assembly for connecting the same to said frame, a pair of driving wheels arranged at the rear of the vehicle and having supporting hubs, a pair of half axles drivingly connected to said wheels, a pair of universal joints connecting the inner ends of said half axles with said final drive means, a tubular housing for each of said half axles having its outer end connected to a wheel supporting hub for transmission of vertical loads thereto, a second pair of universal connections for connecting the inner ends of said tubular housings to said power plant assembly, a pair of radius rods having their respective ends operatively connected to said wheel supporting hubs and to said frame for transmitting the vehicle propelling force from said wheels to said frame, and spring means operatively interposed between said wheel supporting hubs and the power plant assembly for transmission of the entire vertical load from each wheel to said power plant assembly.

7. In a motor vehicle having a frame, a power plant assembly including an engine, a clutch, a transmission, and final drive means arranged in said assembly substantially at the center line of the vehicle; two mounting connections arranged in front of said power plant assembly for connecting the same to said frame, a pair of driving wheels arranged at the rear of the vehicle and having supporting hubs, a pair of half axles drivingly connected to said wheels, a pair of universal joints connecting the inner ends of said half axles with said final drive means, a tubular housing for each of said half axles having its outer end connected to a wheel supporting hub, a second pair of universal connections for connecting the inner ends of said tubular housings to said power plant assembly, a torque tube having its ends secured respectively to said power plant assembly and said frame, a pair of radius rods having their front ends secured to said wheel supporting hubs, and a pair of universal connections for connecting the rear ends of said rods to said frame.

8. In a motor vehicle having a frame, a power plant assembly including an engine, a clutch, a transmission, and final drive means arranged in said assembly substantially at the center line of the vehicle; two mounting connections arranged in front of said power plant assembly for connecting the same to said frame, a pair of driving wheels arranged at the rear of the vehicle and having supporting hubs, a pair of half axles drivingly connected to said wheels, a pair of universal joints connecting the inner ends of said half axles with said final drive means, a tubular housing for each of said half axles having its outer end connected to a wheel supporting hub, a second pair of universal connections for connecting the inner ends of said tubular housings to said power plant assembly, a torque tube having its ends secured respectively to said power plant assembly and said frame, a pair of radius rods having their front ends secured to said wheel supporting hubs, a pair of universal connections for connecting the rear ends of said rods to said frame, a cross leaf spring having a middle portion adapted to receive the weight of the sprung structure of the vehicle and ends operatively connected to the wheel supporting hubs.

9. In a motor vehicle having a frame, a power plant assembly including an engine, a clutch, a transmission, and final drive means arranged in said assembly substantially at the center line of the vehicle; two mounting connections arranged in front of said power plant assembly for connecting the same to said frame, a pair of driving wheels arranged at the rear of the vehicle and having supporting hubs, a pair of half axles drivingly connected to said wheels, a pair of universal joints connecting the inner ends of said half axles with said final drive means, a tubular housing for each of said half axles having its outer end connected to a wheel supporting hub, a second pair of universal connections for securing the inner ends of said tubular housings to said power plant assembly, a torque tube having its ends secured respectively to said power plant assembly and said frame, a pair of radius rods having their front ends secured to said wheel supporting hubs, a pair of universal connections for connecting the rear ends of said rods to said frame, a cross leaf spring having a middle portion adapted to receive the weight of the sprung structure of the vehicle, and a pair of shackles connecting the ends of said spring to said wheel supporting hubs for transmitting thereto the weight of the sprung structure of the vehicle.

JOHN TJAARDA.